April 10, 1956     A. LUDWIG     2,741,154
NEGATIVE HOLDER AND CARRIER
Filed Oct. 20, 1950     2 Sheets-Sheet 1
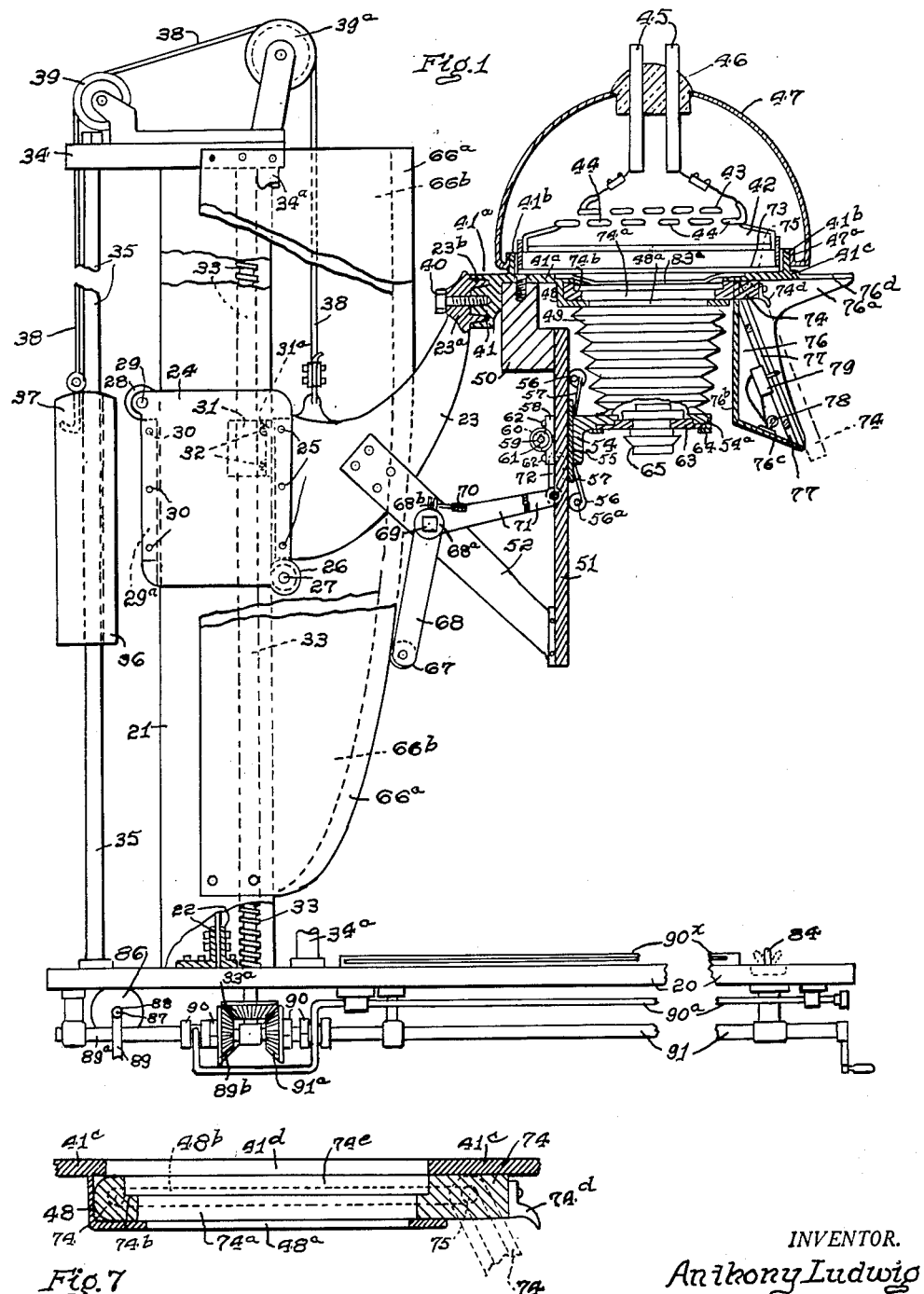
INVENTOR.
Anthony Ludwig
BY Walter W. Burns
Attorney

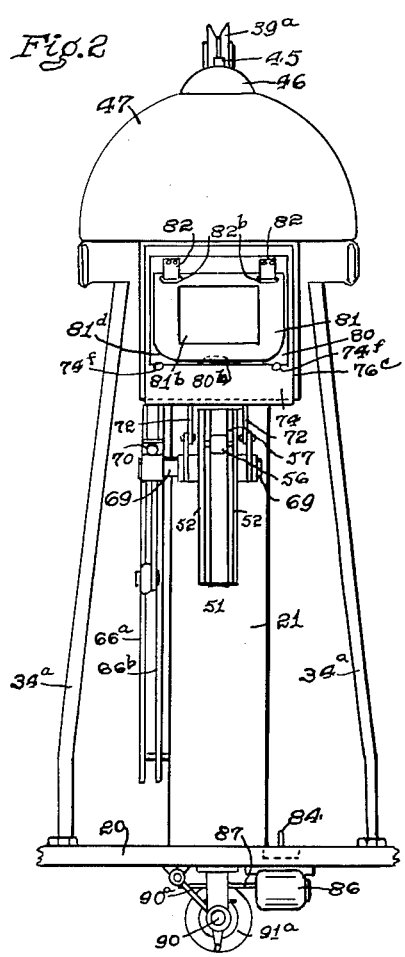
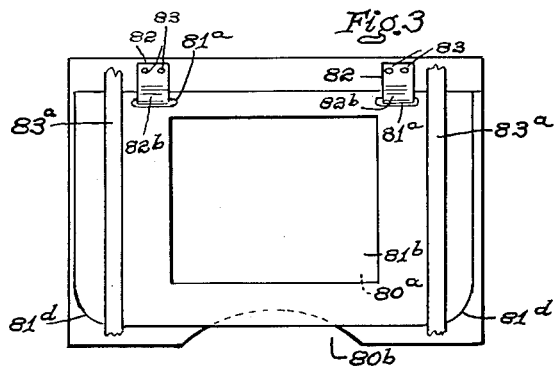
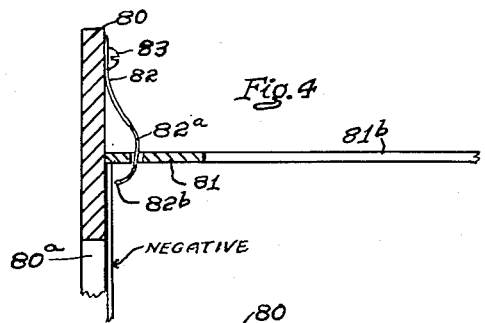
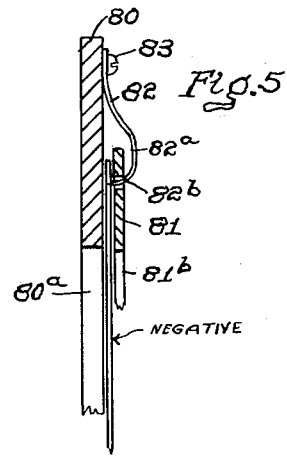
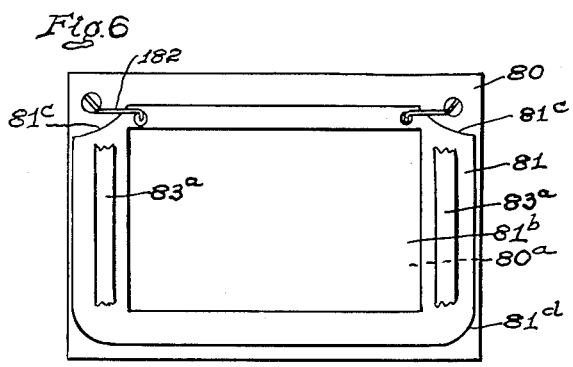
INVENTOR.
Anthony Ludwig
BY Walter W. Burns
Attorney

2,741,154

NEGATIVE HOLDER AND CARRIER

Anthony Ludwig, Falls Church, Va.

Application October 20, 1950, Serial No. 191,102

7 Claims. (Cl. 88—24)

This invention relates to photographic devices and particularly to negative holders and carriers for enlarging apparatus.

In the use of present-day apparatus for making enlargements from photographic negatives, much difficulty is experienced by the operator due to the fact that it is necessary to do so many preliminary operations before the actual exposure is made. This results in too much expenditure of the time of the operator and a consequent lowering of the efficiency of the apparatus as a whole.

The primary object of the present invention is the provision of an improved negative holder and carrier for enlarging machines.

Another object of the invention is the provision of an improved negative holder and carrier wherein the carrier and negative holder when withdrawn from the projecting or operative position for inspection or changing the negative will first move horizontally to clear the bellows of the enlarger and then will tilt to a position where the negative may more readily be changed.

Another and still further object of the invention is the provision of an improved negative holder and carrier wherein a holder has two plates with a gripping means controlled by the angling of the plates relative to each other to grip a negative when the plates are at a predetermined angle and to release the gripping when a predetermined angle is reached.

Still another and further object of the invention is the provision of a negative holder wherein a supporting means is provided to hold one of the two plates in raised position for the removal of a negative or the insertion of another negative when the plates are at a predetermined angle and to release the supported plate when the supported plate is at a lesser angle.

Still another and further object of the invention is the provision of a negative holder wherein a pivot is provided for holding the two plates in swinging relation and to grip the negative at one angle and hold one of the plates in supported position with the gripping means released in another position.

Another and further object of the invention is the provision of an improved enlarging machine having a negative holder and carrier wherein the carrier and holder when in operative position will be spring-held to hold the negative in position, thus making a glass negative holder unnecessary.

Another and still further object of the invention is the provision of an improved enlarging machine wherein the negative holder is provided with two plates hinged together with a resilient hinge having a resilient feature which causes the upper plate to be held in raised or open position during the changing of the negatives and upon closing, grips the negative before the cover plate is fully lowered.

Another object of the invention is to provide an enlarging machine with a sliding negative carrier which when moved from the exposing position, lights a pilot light underneath it to facilitate the placing of the negative in the masking negative holder, the negative carrier sliding in a controlled path, saving time in removing and replacing the carrier; also in placing the negative in the masking holder.

Other and further objects of the invention will be apparent from a reading of the complete specification.

Referring to the drawing wherein are illustrated embodiments of the invention,

Fig. 1 is a side elevational view, partly in section, of one embodiment of the enlarging machine.

Fig. 2 is a front elevational view of the structure illustrated in Fig. 1.

Fig. 3 is a front view of one form of negative holder.

Figs. 4 and 5 are detail views of the holder open and closed.

Fig. 6 is a front view of a negative holder with a modified spring.

Fig. 7 is an enlarged view of the negative holder carrier, as illustrated in Fig. 2.

Referring to the drawing wherein is illustrated an embodiment of the invention, the numeral 20 designates the table of the enlarging machine upon which is placed the paper holder during the enlarging operation.

Extending upwardly from the rear of the table is a standard or support 21 in the form of an H-bar upon which travels a carriage which supports the enlarging camera with all its appurtenances including the negative holder and its carrier, as will be presently described. The lower end of the standard 21 is held in place on the table with a pair of small angle irons 22 which are attached to the table and standard between the flanges of the H-bar. The outer surfaces of the H-bar are preferably finished so that the main carriage of the enlarging camera may move smoothly thereon as will be described.

The carriage comprises an arm 23 which is connected to a pair of plates 24 as by the screws 25. Beneath the arm 23 and journaled in the lower corners of the plates 24, is a pair of rollers 26 mounted on a shaft 27. Another pair of rollers 28 is provided at the opposite side of the standard 21 and these rollers are supported on a shaft 29 which is journaled in the upper corners of the plates 24. The rear edges of the plates 24 are secured to a block 29a by the screws 30. Since the wheels 26 and 28 are flanged, and since there is a slight clearance between the sides of the H-bar 21 and the plates 24, it is obvious that the weight of the parts to be described, at the outer end of the arm 23, will keep the wheels in contact with the flanges of the H-bar and on opposite sides thereof.

Secured to the arm 23 and between the two opposite flanges of the H-bar 21 is a carriage-moving nut 31 which is provided with flanges 31a which are secured to the carriage supporting arm 23 by the screws 32. Extending substantially the length of the H-bar 21, is a screw 33 which has a coactive engagement with the nut 31. As shown, the screw 33 when it rotates, raises and lowers the nut 31 and the arm 23 as will be fully explained.

At the top of the H-bar 21 is a head-piece 34. This head-piece is constructed to fit the top of the H-bar 21 and is held in place by suitable braces 34a. A rear brace bar 35 is secured to the head-piece and extends, in the form shown, vertically downward to the table where it is suitably secured in place. On this brace 35 is a slidably mounted counterweight 36 for reducing the work necessary in the moving of the arm 23 and the parts carried thereby. A hook 37, preferably encased in the weight 36, serves as an attaching means for the wire cable 38 which passes over pulleys 39 and 39a which are suitably journalled on the head-piece 34. The other end of the cable is attached to the arm 23 at the lug 23c by the loop 38a. It is here noted that the weight of the counterweight 36 is substantially equal to the weight of the arm 23 and the parts carried thereby.

At the end of the arm 23 farthest from the H-bar 21 is an adjustable head 23a having an opening for an adjusting screw 40. The screw 40 centers a flange 23b which coacts with a complementary portion 41a of the bracket member 41. The bracket member 41 acts as the main body member of the enlarging camera and carries the light. The main portion of the bracket member 41 is annular in shape to provided an opening for the passage of the light as will presently appear.

The lamp which is the source of illumination will now be described. Forming an integral part of the bracket 41 is a flange 41b which extends around the entire circumference of the bracket and provides a means for limiting the movement of the lamp.

A shield 42 is provided which fits the inside of the flange 41b and has an opening at its opposite side for the lamp proper. This opening is substantially rectangular as herein illustrated.

Disposed to substantially cover the opening in the shield 42 is a suitable light such as a fluorescent tubular lamp. These tubes are designated 43 and 44, the former being superimposed on the latter. These tubes are connected together in series and are connected to a suitable high voltage line 45, the leads of which pass through an insulator 46. The insulator 46 is supported in the top of a shell or dome 47 which has a turned-under roll flange 47a to resiliently engage the outer edge of the flange 41b.

Secured at the underside of the flat portion 41b of the bracket 41 is a rectangular box or frame 48 which has an opening in its bottom as at 48a. This opening 48a is provided to pass the light from the lighting element 43, 44 through the negative holder to the lens as will be described. The frame 48 which may be integral or attached to the flat portion 41c, is provided with an opening at the front of the machine to permit the negative carrier to be inserted or withdrawn by the operator.

Connected to the lower side of the negative carrier bracket 41 is a hanger bracket 50 which serves as a support for the lens carrier guide 51. This lens carrier guide 51 has its opposite end supported by the long bracket members 52 which in turn are supported from the arm 23, by the screws 53.

Sliding on the guide 51 is the lens carrier 54. The slide-contacting members 55 which guide the carrier 54 having at their ends rollers 56 which are connected to the slide contacting members by the roller bracket 57. The lens carrier 54 surrounds the guide 51 and has a bearing block 58 which carries a roller 50 to extend across the rear of the guide 51. The bearing block 58 is provided with slots to receive wire springs 60. The roller 59 is journaled on the shaft 61 which is provided with suitable slots. When the parts are in place, the springs 60 are held in place by the screws 62. As the rollers 56 are mounted on non-resilient shafts 56a and since the shaft 61 has a slight resilient movement, it will be clear that the lens carrier, while having a smooth movement, will not be permitted to be easily shaken from its proper position regardless of its adjustment on the guide 51.

The lens carrier 54 is provided with a recess on its side away from the negative carrier in which is a lens board 63 held in place by the retainer strips 64. The lens board 63 is provided at its center with an opening in which the lens holder 65 is secured in a well known manner.

A suitable lens is provided in the lens holder 65.

A bellows 49 connects the lens carrier to the periphery of the opening in the frame 48a in a well-known manner.

In order to provide a mechanism to raise and lower the enlarging camera relative to the table and to raise and lower the lens carrier relative to both the table and negative carrier, there is provided an automatic focusing mechanism which keeps the enlarging camera in focus and the image on the table sharp, regardless of the distance of the negative carrier from the table, in other words, regardless of the enlargement ratio. The means for carrying out this feature will now be described.

Secured to the standard or H-bar 21 there is provided one or more cams. In the present embodiment, I provided two such cams 66a and 66b. The cam 66a, I term the short focus cam and the cam 66b, I term the long focus cam, since these two cams are for use with two different lenses with relative short and long focal lengths. These two cams 66a and 66b are placed side by side and in position to cooperate with a common means operatively connecting the cam being used, to the lens carrier to move the latter relatively to the table and negative carrier as will be described.

Co-acting with the cams selectively, is a cam roller 67 which is mounted on a focusing lever 68. This focusing lever 68 is adjustably and slidably but non-rotatively mounted on the square shaft 69. This shaft 69 is rotatively mounted in the members 52 which are secured to the arm 23 on opposite sides thereof and converge to a connection with the guide 51 as already mentioned.

The hub 68a of the focusing arm 68 is split as at 68b. To force the split portions together, there is provided a knurled-handled tightening screw 70 to adjustably secure the arm 68 to the squared shaft 69. Secured also to the shaft 69 are two lifting arms 71, which have at their outer ends, a pivoted connection with the lifting links 72. These lifting links 72 are pivotally connected at their other ends to the lens carrier bracket 54. It is thus believed to be clear that as the arm 23 lifts the fulcrum of the bell crank formed by the focusing arm 68, the shaft 69 and the lifting arms 71, the roller 67 by its coaction with the cam 66a or 66b, as the case may be, will cause the relative movement of the lens carrier in accordance with the shape of the cam being used.

In order to shift from one cam to the other, it is necessary only to loosen the screw 70, raise the lens carrier with the hand and slide the focusing arm to a position where the roller 67 will engage the other cam, tighten the screw 70 and release the hand from the lens carrier.

On the upper surface of the annular portion 41c is placed a ground glass 73 which ground glass serves as a diffuser. Below the ground glass 73 and slidably mounted in the frame 48 is a negative holder and its slide carrier with which this invention is concerned and which will now be described.

The main frame of the negative holder carrier, I have designated as 74. This frame 74 has an opening 74a corresponding to the opening 41d and the opening 48a, as shown in Fig. 7. A shoulder 74b is provided as a rest for the negative holder to be presently described. The negative holder carrier 74 is provided with slots 48b which are engaged by the pins 75 which latter are secured in the sides of the pilot light box which I have designated generally at 76. A handle or finger piece 74d is provided on the negative holder carrier 74 for use of the operator in withdrawing the carrier. This pilot light box 76 has sides 76a, a back 76b and a bottom 76c, but is open on its side toward the operator. Arranged in a slanting plane is a negative holder carrier support 77 which is in the form of a frame with an opening large enough to take care of the largest negative for which the machine is designed. Within the box 76 and between the back 76b and the frame 77 is a pair of pilot lights 78 which may be of 15 watt illumination rating.

At one side of the frame 77 is a switch 79 which controls the illumination of the lights 78. The switch 79 is so arranged that when the negative holder carrier 74 is withdrawn from its position, as when the enlarging operation is not taking place, the actuator of the switch 79 will be engaged and actuated by the carrier 74 as the latter reaches its position as illustrated by the dotted line in Fig. 1 and is lowered on the frame 77. The pilot lights 78 will as a result come on and when the negative holder carrier is in place for enlargement, the actuator will be released and the pilot lights 78 will be extinguished. It is to be here noted that the pins 75 are so placed that when the negative holder carrier is pulled out to its limit and the free side lowered, its under side will contact the frame 77 throughout its full length.

The negative holders which fit in the opening 74e of the negative holder carrier 74, are all of the same outer size regardless of the opening for the particular size negative being used. They consist of two leaves or plates hinged together with a suitable hinge which is capable of holding the upper hinged section in raised position when at a predetermined angle. The lower or base plate 80 is of a size to completely fill the recessed space 74e. Hinged at the upper or far side of the base plate 80 is a cover or hold-down plate 81 for holding the negative in place during the printing operation. The cover plate 81 has openings 81a for the reception of the ends of the springs 82. These springs 82 which are held by the screws 83 have portions 82a which are substantially parallel to the plate 81. They also have turned down ends 82b of a length somewhat greater than the thickness of the plate 81 to perform the function of a negative holding, gripping, or retaining means. However, when the upper plate 81 is swung upwardly the parallel portions 82a of the springs are raised, releasing the ends 82b from the negative, and the plate 81 is frictionally held in raised position during the time the negative is being changed. When a new negative is inserted and the upper leaf or cover plate 81 is partially lowered, the ends 82b of the springs 82 engage and grip the negative, at which time the hands of the operator may be released from the negative and the plate 81 lowered against the plate 80. The particular shape of these springs may be varied according to the particular size of negative opening used. It is to be noted that when the cover plate 81 is in raised position, its upper under edge serves as a stop guide for the negative as it is inserted.

In using negative openings 80a and 81b in the respective plates 80 and 81 of a large or maximum size, the upper plates are cut away as at 81c, as shown in Fig. 6, to provide spaces for the springs 82. To facilitate lifting the upper plate 81 while holding the lower plate 80, the corners of the upper plate 81 are cut away as at 81d. To further facilitate the raising of the upper plate, the lower plate 80 is recessed as at 80b to permit the finger of one hand of the operator to easily get under the edge of the plate 81.

When the two plates lie close together, the gripping device 82b is in position to grip the negative. When the cover plate 81 is raised slightly to swing about its pivot, the gripping means is released and the negative will drop into the hand of the operator. Further upward swinging of the cover plate 81 will place it in position where the spring pivot 82 will hold it in raised position as illustrated in Fig. 4.

When the negative holder 80, 81 is in place in the recessed space of 74e of the negative holder carrier 74, and the negative is in place in the holder and the upper plate 81 has been lowered the whole carrier 74 is then raised to a position where it may be pushed into the frame 48. As it moves to its position for the enlargement, the springs 83a which are located at the sides of the opening in the annular portion 41c, press downwardly on the upper plate 81 and hold the negative firmly between the plates 80 and 81.

In order to prevent accidental displacement of the negative holder, the lower edge of the recess 74e is provided with a pair of small screws or nails 74f, the heads of which hold the lower edge of the negative holder in place.

The operation will now be described.

Assuming the short focus lens to be installed in the lens board 63 and the roller 67 to be in registration with the short focus cam 66a, the negative holder carrier 74 is withdrawn by the hand of the operator with the use of the handle 74d and lowered onto the frame 77. This operates the switch 79 to light the bulbs 78. A negative holder 80, 81 with the proper size opening is selected and placed in the carrier 74. The insertion of the negative holder 80, 81 will now be described. With the carrier 74 in its non-operative position, as shown in Fig. 2, the holder is inserted with its upper edge off its seat. When in far enough, the lower edge of the base plate 80 is inserted under the edges of the heads of the nails or screws 74f, after which the holder is allowed to fall on its seat on the shoulder 74b. The upper leaf or plate 81 is raised and the negative put in place, after which the upper plate 81 is lowered. When partially lowered, the inwardly-turned ends 82b of the spring 82, engage and hold the negative in place. The plate 81 is further lowered to hold the negative against the lower plate 80. The carrier is now swung to raised position and pushed inwardly to place the negative in position for enlarging and under the springs 83a which press downwardly on the plate 81. It is to be noted that as the carrier reaches horizontal position, it engages the angle portions 76d which act as guides when the carrier is being pushed into place.

The switch 84 is now operated from the stop position to either the "up" or "down" position. This causes the proper circuit to be closed and the starting of the motor, 86, in the desired direction. This movement through the shaft 87 causes a turning of the worm 88 and in turn, the slower turning of the worm gear 89. And since the worm gear 89 is mounted on a shaft 89a which carries a bevel gear 89b which in turn operates hte bevel gear 33a on the lower end of the raising and lowering screw 33, it follows that the nut 31 will be moved in the direction corresponding to the turning movement of the screw 33. This raises or lowers the whole enlarging camera by its arm 23 and the relative movement of the negative carrier toward or away from the table and the position where the enlarging paper is located. A double clutch member 90 connects either the motor 86 or the hand crank shaft 91 to the bevel gear 89b or the bevel gear 91a to drive the bevel gear 33a by motor or by hand.

And as the movement of the negative carrier is brought about, the action of the cam 66a on the roller 67 moves the focusing arm 68, its shaft 69 and the lifting arms 71. Through the links 72, the lens bracket 54 is then given movement relative to both the negative carrier and the table 20, so that the enlarging image is maintained in sharp focus regardless of the adjustment of the enlarging camera.

By reversing the movement of the switch 84 and stopping at the point where the desired ratio of enlargement has been reached, the machine is ready for the actual printing operation.

The paper having been placed in the paper holder, at the proper position, the main light switch is operated with the resultant illumination of the tubes or coils 43, 44. As the machine is always in focus, it is only necessary to expose the enlarging paper for the required time, when the switch is turned to "off" position. The enlargement paper is now developed.

The several advantages of the invention will now be summarized. Whether the manual or motor means is used for adjusting the enlargement ratio, the construction provides such a practically effortless adjustment as to save much of the operator's time and energy in making hundreds of adjustments in the course of a day.

The negative carrier with its varisize masking negative holders save time in placing the negative in the exposure position and the gripping feature insures a rapid placing and removal of the negative to and from its place and its being held there when so placed. The negative is always in full view of the operator when withdrawn, since the holder when in this position is illuminated by the pilot light underneath. Thus the negative is easily put into a printing position while being securely held in its holder.

While there has been described an embodiment of the invention with certain modifications, it is to be understood that the disclosure is merely illustrative and that many modifications and changes may be made without departing from the spirit of the invention and within its scope as claimed.

Reference is made to my pending application Serial No. 699,812, filed September 27, 1946, in which this invention was set forth, which matured into Patent No. 2,529,507, dated November 14, 1950.

Having described my invention, what I claim is:

1. A negative holder comprising a base plate and a cover plate both having corresponding openings for the passage of light and of a size suitable for the negative to be used and being swingingly connected together, and a negative gripping device including a leaf spring secured to one plate and having a portion normally tending to engage the plate, the other plate having an opening for passage of the leaf spring and having a surface in position for engaging and lifting the leaf spring to withdraw one end of the spring from engagement with the plate when the plates are moved to a predetermined angle relative to each other.

2. A negative holder comprising a base plate and a cover plate both having corresponding openings for the passage of light and of a size suitable for the negative to be used and being swingingly connected together, and a cover plate supporting means, including a plurality of resilient members secured at one of the edges of one plate and each having a portion extending through a respective opening along the edge of the other plate and having their ends extending toward and with a tendency to contact the first plate, one surface of each of the openings in the second plate being so placed as to exert a lifting action on the portions of the resilient members which extend through the openings of the second plate, when the plates are at a relative predetermined angle to each other.

3. A negative holder comprising a base plate and a cover plate both having corresponding openings for the passage of light and of a size suitable for the negative to be used, and a cover plate supporting means including a resilient member secured to the base plate and having a portion extending through an opening in the other plate and tending to be moved toward the base plate, one surface of the opening in the cover plate being so placed as to exert a lifting action on the portion extending through the opening, to move that portion away from the base plate when the plates are in a predetermined angular position relative to each other, the frictional reaction between the surface of the opening and the resilient member being such that the plates will be held, until manually moved, in relative position when they are placed at a predetermined relative angle to each other.

4. A negative holder comprising a base plate and a cover plate both having corresponding openings for the passage of light and of a size suitable for the negative to be used, and a cover plate supporting means including a plurality of leaf spring members secured at one of their ends to one end of one of the plates, and each having a portion extending through openings along the edge of the other plate and having their ends extending toward and with a tendency to contact the first plate, one surface of each of the openings in the second plate, being so placed as to exert a lifting action on the portions of the spring hinge members which extend through the openings of the second plate when the plates are at a relative predetermined angle to each other.

5. A negative holder comprising a base plate and a swinging cover plate, both having corresponding and registering openings for the passage of light and of a size suitable for the negative to be used, means for pivoting the two plates together including a spring pivot member having one end secured to one of the plates, the spring pivot member having a gripping portion in position to grip the negative and hold it in position with relation to a plate opening, coacting means between the other plate and the spring pivot means and acting as a cam to lift the gripping portion from contact with the negative when the second plate is moved to a predetermined angle with relation to the first plate and to release the gripping portion to engage the negative when the second plate is moved to approach a position where the plates are in parallel positions.

6. A negative holder comprising a base plate and a swinging cover plate, both having corresponding and registering openings for the passage of light and of a size suitable for the negative to be used, means for pivoting the two plates together including a spring pivot member having one end secured to one of the plates, the spring pivot member having a gripping portion in position to grip the negative and hold it in position with relation to a plate opening, coacting means between the other plate and the spring pivot means and acting as a cam to lift the gripping portion from contact with the negative when the second plate is moved to a predetermined angle with relation to the first plate and to release the gripping portion to engage the negative when the second plate is moved to approach a position where the plates are in parallel positions and frictionally engaging cooperating and coacting surfaces on one plate and on the spring pivot member for supporting the upper plate in raised position when the latter is raised.

7. A negative holder comprising a base plate and a swinging cover plate, both having corresponding and registering openings for the passage of light and of a size suitable for the negative to be used, means for pivoting the two plates together including a spring pivot member having one end secured to one of the plates, the spring pivot member having a gripping portion in position to grip the negative and hold it in position with relation to a plate opening, coacting means between the other plate and the spring pivot means and acting as a cam to lift the gripping portion from contact with the negative when the second plate is moved to a predetermined angle with relation to the first plate and to release the gripping portion to engage the negative when the second plate is moved to approach a position where the plates are in parallel positions, and coacting surfaces between the spring and swinging plate to place the edge of the latter in a position to form an abutment to limit the position of the negative as it is inserted.

References Cited in the file of this patent

UNITED STATES PATENTS

| | | |
|---|---|---|
| 813,531 | Spencer | Feb. 27, 1906 |
| 1,712,854 | Thonet | May 14, 1929 |
| 1,894,005 | Rose | Jan. 10, 1933 |
| 2,249,228 | Rogers | July 15, 1941 |
| 2,263,025 | Young | Nov. 18, 1941 |
| 2,303,920 | Drucker | Dec. 1, 1942 |
| 2,329,690 | Bolton | Sept. 21, 1943 |
| 2,356,385 | Cooley | Aug. 22, 1944 |